United States Patent
Vogt (10) Patent No.: US 8,577,637 B2
(45) Date of Patent: Nov. 5, 2013

(54) SYSTEM AND METHOD OF MAGNETIC COMPASS CALIBRATION

(75) Inventor: Mark A. Vogt, San Diego, CA (US)

(73) Assignee: Teledyne RD Instruments, Inc., Poway, CA (US)

( * ) Notice: Subject to any disclaimer, the term of this patent is extended or adjusted under 35 U.S.C. 154(b) by 489 days.

(21) Appl. No.: 12/836,908

(22) Filed: Jul. 15, 2010

(65) Prior Publication Data

US 2011/0077889 A1    Mar. 31, 2011

Related U.S. Application Data

(60) Provisional application No. 61/246,501, filed on Sep. 28, 2009.

(51) Int. Cl.
*G01C 17/38* (2006.01)

(52) U.S. Cl.
USPC .................................................. 702/92

(58) Field of Classification Search
USPC ............ 702/57, 85, 91–95, 146, 150; 367/90; 33/319, 320
See application file for complete search history.

(56) References Cited

U.S. PATENT DOCUMENTS

| | | |
|---|---|---|
| 4,031,630 A | 6/1977 | Fowler |
| 4,114,436 A | 9/1978 | Suminsby |
| 4,124,897 A | 11/1978 | Martin |
| 4,327,498 A | 5/1982 | Setter et al. |
| 4,611,293 A | 9/1986 | Hatch et al. |
| 4,622,843 A | 11/1986 | Hormel |
| 4,698,912 A | 10/1987 | Fowler et al. |
| 4,720,992 A | 1/1988 | Hormel |
| 4,797,841 A | 1/1989 | Hatch |
| 4,953,305 A | 9/1990 | Van Lente et al. |
| 5,046,031 A | 9/1991 | Wanous |
| 5,065,521 A | 11/1991 | Waldrop et al. |
| 5,161,311 A | 11/1992 | Esmer et al. |
| 5,165,269 A | 11/1992 | Nguyen |
| 5,208,785 A * | 5/1993 | Brumley et al. ............... 367/90 |
| 5,297,063 A | 3/1994 | Cage |
| 5,297,065 A | 3/1994 | Cage et al. |
| 5,396,709 A | 3/1995 | Swan, Jr. |
| 5,632,092 A | 5/1997 | Blank et al. |
| 5,644,851 A | 7/1997 | Blank et al. |
| 5,689,445 A | 11/1997 | Vogt et al. |
| 5,737,226 A | 4/1998 | Olson et al. |
| 5,802,727 A | 9/1998 | Blank et al. |
| 6,173,501 B1 | 1/2001 | Blank et al. |
| 6,282,803 B1 | 9/2001 | Dunne |
| 6,301,794 B1 | 10/2001 | Parks et al. |
| 6,356,851 B1 | 3/2002 | Young et al. |
| 6,427,349 B1 | 8/2002 | Blank et al. |
| 6,513,252 B1 | 2/2003 | Schierbeek et al. |

(Continued)

*Primary Examiner* — Mohamed Charioui
(74) *Attorney, Agent, or Firm* — Knobbe, Martens, Olson & Bear, LLP (57) ABSTRACT

A system and method of determining a magnetic field and magnetic compass calibration is disclosed. One embodiment is a method of determining a magnetic field vector, the method comprising storing, for each of a plurality of sensor orientations, one or more calibration components, determining, for a sensor orientation not included in the plurality of sensor orientations, a magnetic field vector and a gravity vector, iteratively estimating one or more calibration coefficients based on the stored components, the determined magnetic field vector, and the determined gravity vector, wherein the calibration coefficients are updated during each of a plurality of iterations, and determining a sensor-orientation-independent magnetic field vector based on at least one of the calibration coefficients.

21 Claims, 6 Drawing Sheets

(56) References Cited

U.S. PATENT DOCUMENTS

| | | |
|---|---|---|
| 6,543,146 B2 | 4/2003 | Smith et al. |
| 6,643,941 B2 | 11/2003 | Parks et al. |
| 6,651,003 B2 | 11/2003 | Woloszyk et al. |
| 6,857,194 B2 | 2/2005 | Parks et al. |
| 6,871,411 B1 | 3/2005 | Kang et al. |
| 6,877,237 B1 * | 4/2005 | Withanawasam ............... 33/356 |
| 6,922,902 B2 | 8/2005 | Schierbeek et al. |
| 6,964,108 B2 | 11/2005 | Parks et al. |
| 7,020,971 B1 | 4/2006 | Currie et al. |
| 7,112,793 B2 | 9/2006 | Wright |
| 7,127,823 B2 | 10/2006 | Parks et al. |
| 7,154,267 B2 | 12/2006 | Withanawasam |
| 7,191,533 B2 | 3/2007 | Parks et al. |
| 7,248,983 B2 | 7/2007 | Fillatreau et al. |
| 7,260,896 B2 | 8/2007 | Fillatreau et al. |
| 7,331,115 B2 | 2/2008 | Schierbeek et al. |
| 7,353,614 B2 | 4/2008 | Parks et al. |
| 7,451,549 B1 | 11/2008 | Sodhi et al. |
| 7,458,166 B2 | 12/2008 | Parks et al. |
| 2009/0254294 A1 * | 10/2009 | Dutta ............................ 702/92 |
| 2009/0281739 A1 * | 11/2009 | Ikkink et al. .................... 702/57 |

* cited by examiner

SYSTEM AND METHOD OF MAGNETIC COMPASS CALIBRATION

CROSS-REFERENCE TO RELATED APPLICATIONS

This application claims the benefit under 35 U.S.C. §119(e) of U.S. Provisional Application No. 61/246,501, filed Sep. 28, 2009, the disclosure of which is herein incorporated by reference in its entirety.

BACKGROUND OF THE INVENTION

1. Field of the Invention

The disclosed technology relates to magnetic compasses and their calibration.

2. Description of the Related Technology

Generally, a compass is used to orientate the user with respect to the earth. Such orientation can be used for navigation or to convert measurements into a fixed reference frame. Multiple measurements, once converted into a fixed reference frame, can be compared, combined, or otherwise used together. A magnetic compass often determines the strength of a magnetic field, in geographic coordinates, at the location of the compass. In most cases, the determined magnetic field will be that of the earth. This information can be used to, for example, determine magnetic north. In another application, a magnetic compass simply indicates the direction of magnetic north.

Several challenges exist when calibrating a magnetic compass. For example, the compass may be on a relatively unstable platform, such as a small boat, during the calibration. In general, the quality of the calibration is reduced in highly dynamic conditions, such as when the platform is in motion during the calibration. In one application, the velocity of a given volume of water is desired referenced to a fixed coordinate system, e.g. geographic coordinates. Because the measuring platform may move in relation to this coordinate system (e.g., roll, pitch, yaw, and relative velocity), measurements made by the platform in its own coordinate system can be transformed to the fixed coordinate system.

As another example, local distortions of the earth's magnetic field may be present as a result of nearby magnetic minerals, such as basalt, or from solar activity. Further, magnetic north does not coincide with geographic (polar) north. Local perturbations from the substantially uniform magnetic field of the earth are generally classified as either hard iron effects or soft iron effects. Hard iron effects are measured as an offset from the earth's magnetic field, whereas soft iron effects are measured as a rotation and/or scaling of the earth's magnetic field.

Some magnetic compasses include a magnetometer and an accelerometer. A magnetometer senses and provides information regarding magnetic fields. An accelerometer senses and provides information regarding acceleration. By combining these measurements, the difference between a fixed reference frame, such as the earth, and a local reference frame, such as a vessel, can be determined.

Accordingly, a need exists for improved calibration methods.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include improved calibration when samples are received at less than all orientations.

Aspects include systems and methods of magnetic compass calibration. One aspect includes a method of calibrating a magnetic compass which includes receiving sample data indicative of a measured magnetic field vector and a measured gravity vector from at least one sensor oriented at a first plurality of orientations, and receiving a plurality of stored magnetic compass calibration components associated with a second plurality of orientations of the at least one sensor. The second plurality of orientations includes at least one orientation that is absent from the first plurality of orientations. The method further comprises estimating a plurality of calibration coefficients based on the sample data and based on previously stored magnetic calibration components. In one aspect, the estimating comprises partitioning a first estimate of the calibration coefficients based on observability of the calibration coefficients at the first plurality of orientations. Observability of the calibration coefficients is determined based on the sample data at the first plurality of orientations. The method further comprises generating a weighting of the stored magnetic compass calibration components and the first estimate of the calibration coefficients based on the sample data and determining the estimated plurality of coefficients based at least in part on the weighting. Other aspects include magnetic compasses and calibration systems.

In one aspect, estimating the plurality of calibration coefficients comprises performing an iterative least squares estimate based on minimizing the sum of the squared error between the actual and estimated magnetic field in geographic coordinates over the sample data. In one such embodiment, the iterative least square estimate is further based on minimizing a distance between the estimated plurality of calibration coefficients and the plurality of stored magnetic compass calibration components.

One aspect further comprises receiving accelerometer data indicative of pitch and roll of the magnetic compass; and estimating the plurality of calibration coefficients based on the received accelerometer data.

In one aspect, generating a weighting comprises weighting the stored calibration coefficients based on an inverse relationship to the observability of the first estimate of the calibration coefficients at the first plurality of orientations.

One aspect is a method of determining a magnetic field vector, the method comprising storing, for each of a plurality of sensor orientations, one or more calibration components, determining, for a sensor orientation not included in the plurality of sensor orientations, a magnetic field vector and a gravity vector, iteratively estimating one or more calibration coefficients based on the stored components, the determined magnetic field vector, and the determined gravity vector, wherein the calibration coefficients are updated during each of a plurality of iterations, and determining a sensor-orientation-independent magnetic field vector based on at least one of the calibration coefficients.

Another aspect is a magnetic compass comprising a memory storing, for each of a plurality of sensor orientations, one or more calibration components, a magnetometer configured to determine a magnetic field vector for a sensor orientation not included in the plurality of sensor orientations, an accelerometer configured to determine a gravity vector for the sensor orientation not included in the plurality of sensor orientations, and a processor configured to i) iteratively estimate one or more calibration coefficients based on the stored components, the determined magnetic field vector, and the determined gravity vector, wherein the calibration coefficients are updated during each of a plurality of iterations and ii) determine a sensor-orientation-independent magnetic field vector based on at least one of the calibration coefficients.

Another aspect is a system for determining a magnetic field vector, the system comprising means for storing, for each of a plurality of sensor orientations, one or more calibration components, means for determining, for a sensor orientation not included in the plurality of sensor orientations, a magnetic field vector and a gravity vector, means for iteratively estimating one or more calibration coefficients based on the stored components, the determined magnetic field vector, and the determined gravity vector, wherein the calibration coefficients are updated during each of a plurality of iterations, and means for determining a sensor-orientation-independent magnetic field vector based on at least one of the calibration coefficients.

Another aspect is a computer-readable storage medium storing instructions, which when executed by a processor, cause the processor to receive data, for each of a plurality of sensor orientations, indicative of one or more calibration components, determine, for a sensor orientation not included in the plurality of sensor means for determining, for a sensor orientation not included in the plurality of sensor orientations, a magnetic field vector and a gravity vector, iteratively estimate one or more calibration coefficients based on the data indicative of one or more calibration components, the determined magnetic field vector, and the determined gravity vector, wherein the calibration coefficients are updated during each of a plurality of iterations, and determine a sensor-orientation-independent magnetic field vector based on at least one of the calibration coefficients.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

One embodiment relates to an improved magnetic calibration to remove soft and hard iron effects which can reduce the accuracy of a magnetic compass. As noted above, in one embodiment, the accuracy of the calibration is reduced in highly dynamic conditions, such as when the platform upon which the compass is mounted is moving during the calibration. In addition, the compass user may not know or trust the source of the data or the quality of the data originally used in an initial calibration, as such initial calibration may be performed by the manufacturer or prior to arriving at the location at which measurements are being taken. In one embodiment, calibration is performed by placing the compass in a variety of orientations from which the distortions in the magnetic field can be determined. However, it may not be possible to position the compass in as many orientations as desired. In such a situation, it is desirable for the compass to be accurate over the sampled orientations and at least not worse over the unsampled orientations.

Desirably, according to one embodiment, for calibrations over a limited range of orientations, the post-calibration compass accuracy is better over that limited range and does not deteriorate over the unsampled orientations as compared to prior to the calibration. According to one embodiment, a method blends the new calibration with the old calibration coefficients.

Figure 1:
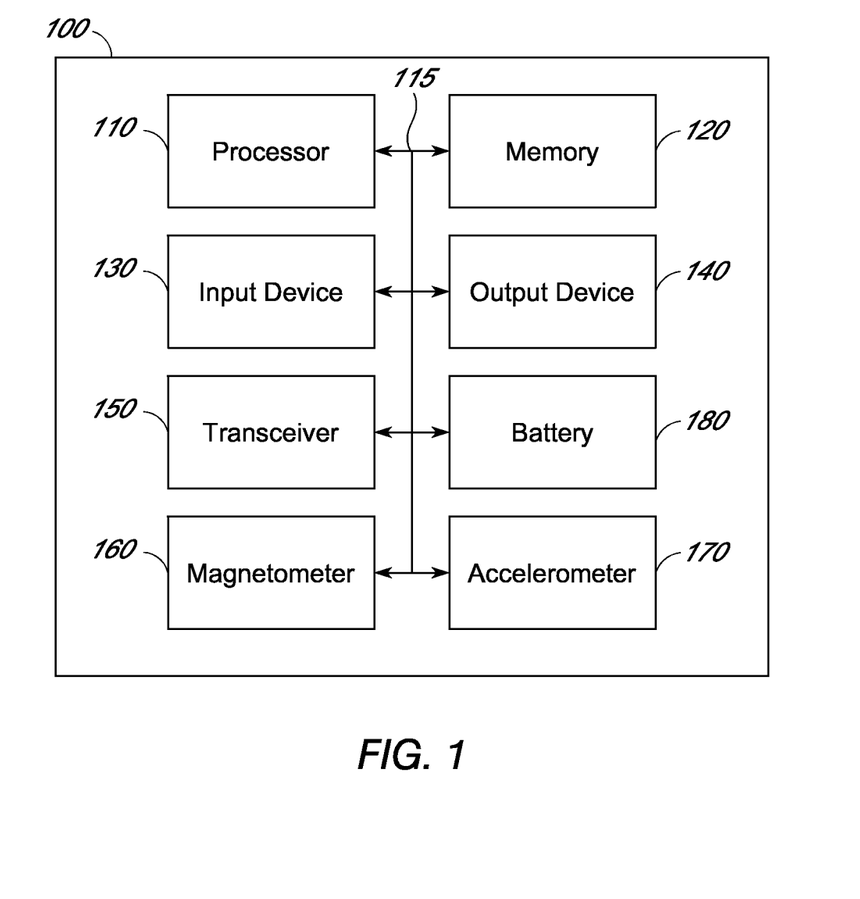
FIG. 1 is a block diagram illustrating one embodiment of a magnetic compass and calibration system.

FIG. 1 is a functional block diagram of a magnetic compass and calibration system 100. The system 100 includes a processor 110 in data communication with a memory 120, an input device 130, and an output device 140. In one embodiment, the processor is further in data communication with a transceiver 150 for communication over one or more wired or wireless communication links. The system 100 includes one or more magnetometers 160 in data communication with the processor 110. The system 100 also includes one or more accelerometers 170 in data communication with the processor 110. The system 100 and components thereof are powered by a battery 180 and/or an external power source.

Although described separately, it is to be appreciated that functional blocks described with respect to the system 100 need not be separate structural elements. For example, the processor 110 and memory 120 may be embodied in a single chip. Similarly, two or more of the processor 110, modem 150, and transceiver 160 may be embodied in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor 110 may also be implemented as a combination of computing devices, e.g., a combination of a DSP and a microprocessor, a plurality of microprocessors, one or more microprocessors in conjunction with a DSP core, or any other such configuration.

The processor 110 can be coupled, via one or more buses 115, to read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, and magnetic tape.

The processor 110 is also coupled to an input device 130 and an output device 140 for, respectively, receiving input from and providing output to, a user of the system 100. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices. The input device 130 and output device 140 can provide a user interface for the system 100. In other embodiments, the system may be connected to a system that provides the user interface.

The processor 110 is further connected to a transceiver 150. The transceiver 150 prepares data generated by the processor 110 for wireless transmission via one or more antennas 170 according to one or more air interface protocols or for wired transmissions according to one or more wired interface protocols. One or both of these protocols may be a standard. The transceiver 150 also demodulates data received over the interface.

The system 100 includes one or more magnetometers 160 which sense and provide information to the processor 110 regarding magnetic fields. One or more of various types of magnetometers may be employed including, but not limited to, a rotating coil magnetometer, a Hall effect magnetometer, a proton precession magnetometer, a gradiometer, a fluxgate magnetometer, a cesium vapor magnetometer, a spin-exchange relaxation-free (SERF) atomic magnetometer, or a superconducting quantum interference device (SQUID) magnetometer. In one embodiment, the magnetometer is a MEMS device (microelectromechanical system) based on magnetoresistivity. Magnetoresistive-based magnetometers are solid state, not mechanical, and are therefore not susceptible to many of the effects that normally corrupt mechanical systems.

The system 100 includes one or more accelerometers 170 which sense and provide information to the processor 110 regarding acceleration. Because gravity provides a substantially constant acceleration, an accelerometer can be used to orient a device with respect to the center of the earth. In addition to the information from the magnetometers 160, this information can be used to determine the difference between a fixed reference frame (such as the earth) and a local reference frame (such as a vessel). One or more of various types of accelerometers may be employed including, but not limited to, piezoelectric sensors, shear mode accelerometers, laser accelerometers, or mechanical accelerometers.

In one embodiment, the system 100 can be integrated with an acoustic Doppler current profiler (ADCP) or a Doppler log. An ADCP is a type of sonar system used to remotely measure water velocity over varying ranges. Such a system measures the velocity of water by calculating the Doppler shift associated with received echoes from an acoustic signal produced by transducers and radiated into the water in vertical columns or beams. Particles, inhomogeneities, and other phenomena present in the water of a given vertical column result in reflection of the radiated acoustic signal back toward the transducer. The frequency of the backscattered acoustic signal is shifted in frequency according to the well known Doppler relationship. One embodiment of an ADCP is disclosed in U.S. Pat. No. 5,208,785, herein incorporated by reference in its entirety.

As mentioned above, in one embodiment, the velocity of a given volume of water under measurement is desired referenced to the geographic coordinate system. In one embodiment, a measuring instrument, such as an ADCP, provides information in a local coordinate system relative to the instrument. Because the measuring platform on which the instrument is mounted may move in relation to geographic coordinates (e.g., roll, pitch, yaw, and relative velocity), measurements made by instrument in its own coordinate system can be transformed to the fixed coordinate system. In one embodiment, a magnetic compass is used to determine how to perform this transformation.

As mentioned above, several challenges exist when calibrating a magnetic compass, such as a dynamic platform, unknown initial calibration quality, local distortions in the magnetic field, or the inability to sufficiently sample local distortions in the magnetic field in a variety of orientations.

Overview of Calibration

A compass is a device used to orientate the user with respect to the earth. In one embodiment, a magnetic compass determines the strength of a magnetic field, in geographic coordinates, at the location of the compass. In most cases, the determined magnetic field will be that of the earth. This information can be used to, for example, determine magnetic north or, as described below, transform measurements in a local coordinate system to a fixed coordinate system. As used herein, $B_G$ is a 3×1 vector of the actual magnetic field of the earth in geographic coordinates. Further, $\hat{B}_G$ is a 3×1 vector of the determined magnetic field of the earth in geographic coordinates. The magnetic field of the earth can be determined using one or more movable instruments. Accordingly, $B_I$ is a 3×1 vector of the actual magnetic field of the earth in instrument coordinates. Further, $\hat{B}_I$ is a 3×1 vector of the determined magnetic field of the earth in instrument coordinates. In one embodiment, the compass includes a magnetometer which measures the magnetic field in instrument coordinates. As used herein, $F_I$ is a 3×1 vector of the actual magnetic field in instrument coordinates. Further, $\hat{F}_I$ is a 3×1 vector of the determined magnetic field in instrument coordinates. However, this magnetic field, $F_I$, includes perturbations from the magnetic field of the earth $B_I$, as described in the equations below.

Ideally, conversion between instrument coordinates and geographic coordinates could be obtained using a 3×3 conversion matrix, M, based on a measurement of the compass' position with respect to the earth. Accordingly, as used herein, $M_I^G$ is a 3×3 matrix for converting between instrument coordinates and geographic coordinates having a matrix inverse $M_G^I$ for converting between geographic coordinates and instrument coordinates. Because these conversation matrices may be based on measurements from, in one embodiment, an accelerometer, $\hat{M}_I^G$ and $\hat{M}_G^I$ represent estimates of these matrices.

Distortions of the earth's magnetic field are a result of external magnetic influences generally classified as either hard iron effects or soft iron effects. Hard iron effects are measured as an offset from the earth's magnetic field, whereas soft iron effects are measured as a rotation and/or scaling of the earth's magnetic field. Thus, in one embodiment, the relationship between the earth's magnetic field and the magnetic field in instrument coordinates is $$F_I = U^{-1} M_G^I B_G + P + \eta, \quad (1)$$

where P is a 3×1 vector representing the hard iron effects, $U^{-1}$ is a 3×3 matrix representing the soft iron effects, and $\eta$ is a 3×1 vector of measurement noise. In one embodiment, $U = (I-T)^{-1}$, wherein T is a 3×3 tensor of soft iron perturbations. Following the conventions above, $\hat{U}$ and $\hat{P}$ are estimates of U and P, respectively.

When the field is measured, this measurement is sampled by hardware and converted to ADC (analog-to-digital conversion) counts. This can be modeled by the following equation:

$$X = S_0 \hat{F}_I + K_0, \quad (2)$$

where $S_0$ is a 3×3 matrix of hardware sensitivity coefficients, $K_0$ is a 3×1 vector of hardware offsets, and $\hat{F}_I$ is, as mentioned above, a 3×1 vector of the determined magnetic field in instrument coordinates. It is related to an estimate of the earth's field by the following equation:

$$\hat{F}_I = U^{-1}(\hat{B}_I - P) \quad (3)$$

$S_0$ and $K_0$ are, in one embodiment, determined at calibration and account for hardware scale factors and offsets. Thus, in one embodiment, the equation used by firmware is as follows:

$$\hat{F}_I = S_0^{-1}(X - K_0). \quad (4)$$

The field calibration allows estimation of the earth's field in instrument coordinates (i.e., the local field without the soft iron and hard iron perturbations). This can be described by the following equation:

$$\hat{B}_I = \hat{U} U^{-1} M_G^I B_G + P - \hat{P}. \quad (5)$$

Combining equations 3 and 4 yields another equation for the earth's field in instrument coordinates:

$$\hat{B}_I = S_1^{-1}(X - K_1), \quad (6)$$

where $$S_1^{-1} = \hat{U} S_0^{-1}$$

$$K_1 = K_0 + S_0 \hat{U}^{-1} \hat{P}. \quad (7)$$

Thus, Equation 6 allows for conversion from instrument measurement to an estimate of the earth's magnetic field in instrument coordinates, accounting for hardware scale factors and offsets as well as scale factors and offsets caused by soft and hard iron perturbations.

Magnetic Hard and Soft Iron Calibration Algorithm

As noted above, one model for the magnetic field in instrument coordinates is $$F_I = U^{-1} M_G^U B_G + P + \eta. \quad (8)$$

This equation can be solved for $B_G$, the earth's magnetic field in geographic coordinates as shown below.

$$B_G = M_I^G U(F_I - P - \eta) \quad (9)$$

Setting Q=UP, where Q is a 3×1 vector, this can be rewritten as $$B_G = M_I^G U F_I - M_I^G Q - M_I^G U \eta. \quad (10)$$

In one embodiment, a least squares algorithm is applied to the error in the horizontal and vertical components of the earth's magnetic field in geographic coordinates. The least squares problem is solved in the geographic coordinate frame. Because the East-West component of the earth's magnetic field vector is zero in this frame, the remaining horizontal component and vertical component are used. Rather than carry zeros throughout the equations below, $B_G$, defined as a 3×1 vector above, is treated as a 2×1 vector below. After some manipulation, it can be written that $$\hat{B}_G = \hat{W} \hat{V} \quad (11)$$

where $\hat{B}_G$ is an estimate of the earth's magnetic field in geographic coordinates, a 2×1 vector. $\hat{W}$ is a 2×12 vector composed of the measured field and the estimated rotation matrix and $\hat{V}$ is a 12×1 vector of estimated perturbation parameters composed as shown below.

$$\hat{W}^T = \begin{bmatrix} \hat{F}_1 \hat{M}_{21} & \hat{F}_1 \hat{M}_{31} \\ \hat{F}_2 \hat{M}_{21} & \hat{F}_2 \hat{M}_{31} \\ \hat{F}_3 \hat{M}_{21} & \hat{F}_3 \hat{M}_{31} \\ \hat{F}_1 \hat{M}_{22} & \hat{F}_1 \hat{M}_{32} \\ \hat{F}_2 \hat{M}_{22} & \hat{F}_2 \hat{M}_{32} \\ \hat{F}_3 \hat{M}_{22} & \hat{F}_3 \hat{M}_{32} \\ \hat{F}_1 \hat{M}_{23} & \hat{F}_1 \hat{M}_{33} \\ \hat{F}_2 \hat{M}_{23} & \hat{F}_2 \hat{M}_{33} \\ \hat{F}_3 \hat{M}_{23} & \hat{F}_3 \hat{M}_{33} \\ -\hat{M}_{21} & -\hat{M}_{31} \\ -\hat{M}_{22} & -\hat{M}_{32} \\ -\hat{M}_{23} & -\hat{M}_{33} \end{bmatrix} \hat{V} = \begin{bmatrix} \hat{U}_{11} \\ \hat{U}_{21} \\ \hat{U}_{31} \\ \hat{U}_{12} \\ \hat{U}_{22} \\ \hat{U}_{32} \\ \hat{U}_{13} \\ \hat{U}_{23} \\ \hat{U}_{33} \\ \hat{Q}_1 \\ \hat{Q}_2 \\ \hat{Q}_3 \end{bmatrix} \quad (12)$$

Above, $\hat{F}_i$ is the ith element of vector $\hat{F}_I$, $\hat{Q}_i$ is the ith element of vector $\hat{Q}$ (an estimate of Q), $\hat{M}_{ij}$ is the element in the ith row and jth column of the matrix $\hat{M}_I^G$ (an estimate of $M_I^G$), and $\hat{U}_{ij}$ is the element in the ith row and jth column of the matrix $\hat{U}$ (an estimate of U).

Least Squares Solution

One embodiment includes a least squares method that minimizes the sum of the squared error between the actual and estimated magnetic field in geographic coordinates over all N samples during the calibration, where N is one or more. The mean-squared error, $\epsilon_B$, can be expressed as below.

$$\varepsilon_B = \sum_i^N (B_G - \hat{B}_{i,G})^T (B_G - \hat{B}_{i,G}) \quad (13)$$

$$= \sum_i^N (B_G - \hat{W}_i \hat{V})^T (B_G - \hat{W}_i \hat{V}),$$

where $\hat{B}_{i,G}$ is the estimate of the earth's magnetic field for the ith sample and $\hat{W}_i$ is the measured field and the estimated rotation matrix for the ith sample.

The actual field, $B_G$, is unknown and must be solved for during the calibration as well. The average field, $\overline{B}_G$, is calculated during the calibration where $$\overline{B}_G = \frac{1}{N} \sum_i^N \hat{M}_{i,I}^G \hat{F}_i, \quad (14)$$

where $\hat{M}_{i,I}^G$ is the estimated rotation matrix for the ith a priori parameter, and $\hat{F}_i$ is the measured field in instrument coordinates for the ith a priori parameter.

This is a nonlinear problem because both $\overline{B}_G$ and $\hat{W}_i$ depend on the current estimate of $\hat{V}$. The error is minimized when $$\hat{V} = \left[ \sum_i^N (\hat{W}_i^T \hat{W}_i) \right]^{-1} \left[ \sum_i^N \hat{W}_i^T \right] \overline{B}_G. \quad (15)$$

Figure 2:
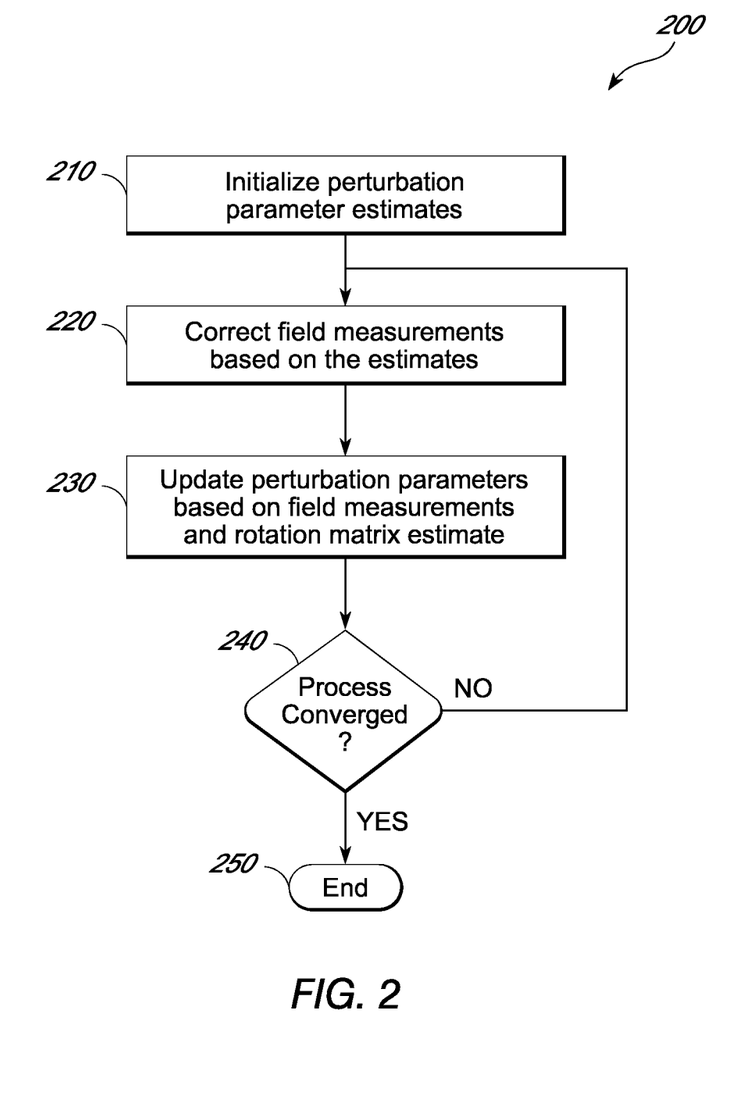
FIG. 2 is a flowchart illustrating a method of iteratively estimating the earth's magnetic field in geographic coordinates.

In one embodiment, an iterative approach is used to deal with the nonlinearity, as described below with respect to FIG. 2. FIG. 2 is a flowchart illustrating a method of iteratively estimating the earth's magnetic field in geographic coordinates. The method 200 can be performed, in one embodiment, by the system 100 of FIG. 1.

The method 200 begins, in block 210, by initializing estimates for perturbation parameters. In one embodiment, the initialization is performed by the processor 110 in conjunction with the memory 120, in which initial values are written into the memory 120. In one embodiment, $\hat{U}$ is initialized as an identity matrix, I, and $\hat{Q}$ is initialized as a zero vector.

Next, in block 220, the estimates for iteration k, $\hat{U}_k$ and $\hat{Q}_k$ are used to correct the field measurements in instrument coordinates. The correction can be performed, for example, by the processor 110 of FIG. 1. In one embodiment, the field measurements are corrected according to the following equation:

$$\hat{F}_I = \hat{U}_k U^{-1} M_G^I B_G + P - \hat{P}_k + \eta \quad (16)$$

Continuing to block 230, the corrected field and an estimate of the rotation matrix is used to update the perturbation parameters. In one embodiment, the updating is performed by the processor 110. In one embodiment, the estimate of the rotation matrix is determined in conjunction with data from one or more accelerometers 170 used to estimate heading, pitch, and roll.

In one embodiment, the perturbation parameters are updated by first accumulating the two summations for equation 15. Next, using the following equations, $\hat{V}_{k+1}$, $\hat{U}_{k+1}$, $\hat{Q}_{k+1}$ and $\hat{P}_{k+1}$ are determined.

$$\hat{V}_{k+1} = \left[\sum_i^N (\hat{W}_i^T \hat{W}_i)\right]^{-1} \left[\sum_i^N \hat{W}_i^T\right] \overline{B}_{G,k+1} \quad (17)$$

$$\hat{U}_{k+1} = \hat{U}_k + \begin{bmatrix} \hat{V}_1 & \hat{V}_2 & \hat{V}_3 \\ \hat{V}_4 & \hat{V}_5 & \hat{V}_6 \\ \hat{V}_7 & \hat{V}_8 & \hat{V}_9 \end{bmatrix} - I \quad (18)$$

where $\hat{V}_i$ is the ith element of the vector $\hat{V}_{k+1}$.

In one embodiment, $\hat{U}_{k+1}$ is normalized as follows:

$$\hat{U}_{k+1,norm} = \frac{3\hat{U}_{k+1}}{\hat{U}_{k+1,11} + \hat{U}_{k+1,22} + \hat{U}_{k+1,33}} \quad (19)$$

$$\hat{Q}_k = \begin{bmatrix} V_{11} \\ V_{12} \\ V_{13} \end{bmatrix} \quad (20)$$

$$\hat{P}_k = \hat{U}_k^{-1} Q_k + \hat{P}_{k-1} \quad (21)$$

Equation 19, which normalizes the $\hat{U}_k$ matrix, assumes that the soft iron perturbations do not change the strength of the magnetic field. If this is not true, then an embodiment of the method 200 in which equation 19 is used will over estimate the magnetic field, $\hat{B}_G$, by the same magnitude as the soft iron perturbations. However, the estimated magnetic field dip angle will not be effected.

The method 200 continues to block 240 where it is determined if the iterative process has converged. This determination can be performed, in one embodiment, by the processor 110 of FIG. 1. In one embodiment, it is determined that the process has converged if the difference between the parameters of an iteration and the next iteration is below a threshold. In another embodiment, it is determined that the process has converged if a predetermined number of iterations has occurred, regardless of the values of the parameters. In another embodiment, various convergence criteria are combined.

If it is determined that the process has converged, the method 200 ends in block 250. Otherwise, the method 200 returns to block 220 and repeats.

The method 200 may not converge, according to some criteria, unless $$\sum_i^N (\hat{W}_i^T \hat{W}_i)$$

is a matrix with full rank. The matrix will be full rank if the attitude during calibration covers rotations about all three axes.

The Constrained and Weighted Least Squares Solution

The parameters being solved for may not all be observable, e.g., when $$\sum_i^N (\hat{W}_i^T \hat{W}_i)$$

is not full rank. One embodiment allows the calibration data to determine parameters that are easily determined from the data when the calibration orientations fail to make all the parameters observable. Hence, according to one embodiment, the cost function is then:

$$\varepsilon_{B,CV} = \sum_i^N (\overline{B}_G - \hat{W}_i \hat{V})^T (\overline{B}_G - \hat{W}_i \hat{V}) + \sum_i^N (\hat{V} - V_0)^T C(\hat{V} - V_0), \quad (22)$$

with the least squares error minimized when:

$$\hat{V} = \left[\sum_i^N (\hat{W}_i^T \hat{W}_i + C)\right]^{-1} \sum_i^N (CV_0 + \hat{W}_i^T \overline{B}_G). \quad (23)$$

One embodiment of assigning a cost function weights the original parameters in an inverse relationship to the observability of the parameters in the calibration data. This information is contained in the matrix $\hat{W}_i^T \hat{W}$ and is apparent after applying singular value decomposition to the matrix $\hat{W}_i^T \hat{W}$:

$$\hat{W}_i^T \hat{W} = U_{svd} S_{svd} V_{svd}^T. \quad (24)$$

Examining the diagonal matrix $S_{svd}$ will indicate whether the calibration data makes the parameters observable. Small values on the diagonal of this matrix indicate a singular or near singular matrix. The vectors in $V_{svd}$ corresponding to the singular values span the null space of $\hat{W}_i^T \hat{W}$ whereas the vectors in $U_{svd}$ that correspond to the non-singular values span the range of $\hat{W}_i^T \hat{W}$.

In one embodiment, the method includes inverting these diagonal entries (with zero entries replaced with suitably small ones in one embodiment) to determine weights for the original parameter set and then reapplying the decomposition matrices $U_{svd}$ and $V_{svd}$ to weight the original parameter by these diagonal entries. Then the weights are $$C = U_{svd} S_{svd}^{-1} V_{svd}^T. \quad (25)$$

This weighting function effectively splits the solution into a part that is determined by the calibration data and a part that is determined by parameters before the calibration.

Convergence Criterion

The algorithm will typically converge in less than 10 iterations for typical soft and hard iron perturbations. However, if the prior calibration misaligned the magnetic sensor axis relative to the accelerometer axes, the convergence can take longer.

In one embodiment, determining if convergence has occurred, such as is described above with respect to block 240 of FIG. 2, is based on estimating the distance the parameters have changed between iterations in the parameter space. In one embodiment, the soft iron perturbation matrix is normalized, as the estimate for this matrix can differ from the factory calibration by a scale factor depending on the calibration field strength. Normalizing the matrix makes the criterion substantially equivalent for all calibration field strengths. Defining the normalized soft iron perturbation estimate from the last iteration as:

$$|\hat{U}_{k-1,norm}| \langle \operatorname{diag}(\hat{U}_{k-1}{}^T \hat{U}_{k-1}) \rangle, \quad (26)$$

the average distance the soft iron parameters have moved since the last iteration can be estimated as:

$$\Delta \hat{U}_k = \sqrt{\frac{1}{9} \sum_{i,j} \left[ \frac{(\hat{U}_k - \hat{U}_{k-1})}{|\hat{U}_k|} \right]^2} \quad (27)$$

Similarly, the average distance the hard iron perturbations have moved can be estimated as:

$$\Delta \hat{P}_k = \sqrt{\frac{1}{3} \sum_i (\hat{P}_k - \hat{P}_{k-1})^2}. \quad (28)$$

User Interface Description.

In one embodiment, a screening test is performed during calibration which checks the sensor data, such as that from the magnetometer 160 or accelerometer 170 of FIG. 1, for attitude rates including, but not necessarily limited to, heading, pitch, roll, or angular rate. If the attitude rates are above a user-defined threshold, the sensor data may not be included in the calibration.

Figure 3:
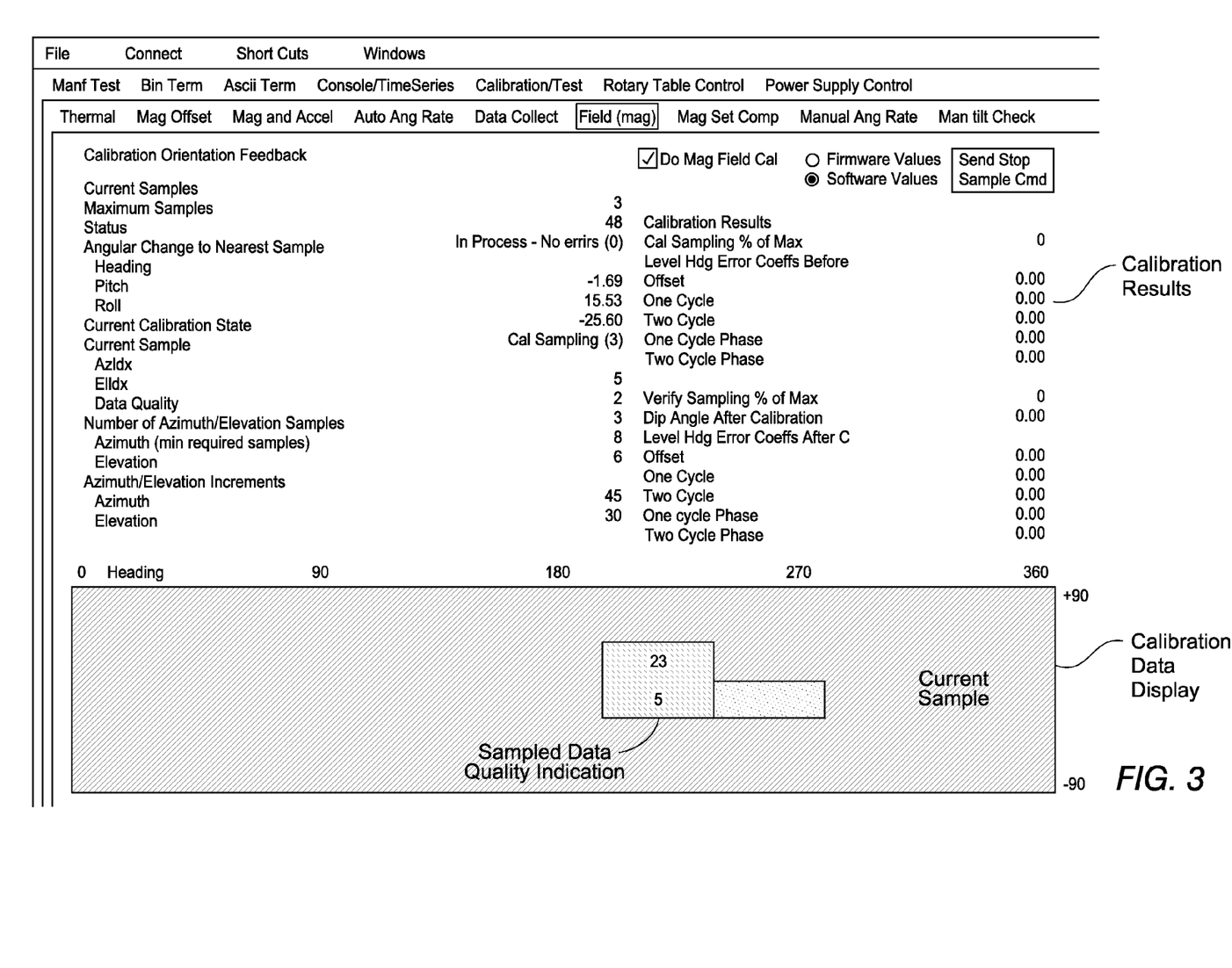
FIG. 3 is a screenshot illustrating one embodiment of a user interface for calibrating a magnetic compass.

A calibration algorithm that runs on a host system can provide a user with graphical feedback on the orientation of the samples taken and their quality. FIG. 3 shows an example of the graphical user interface. In one embodiment, the graphical display of the data shows the extent of data coverage and/or the quality of data. The quality of calibration is related to the quality of the data input to the algorithm.

Other features (which may or may not be found in all embodiments) that can contribute to improved calibration results are:

1) a verification test which is run following the calibration to ensure a quality calibration;
2) user-adjustable sample screening which automatically rejects samples that do not meet a stability threshold; and
3) heading error estimation (of single and/or double cycle errors) for the prior and new calibration.

Figure 4:
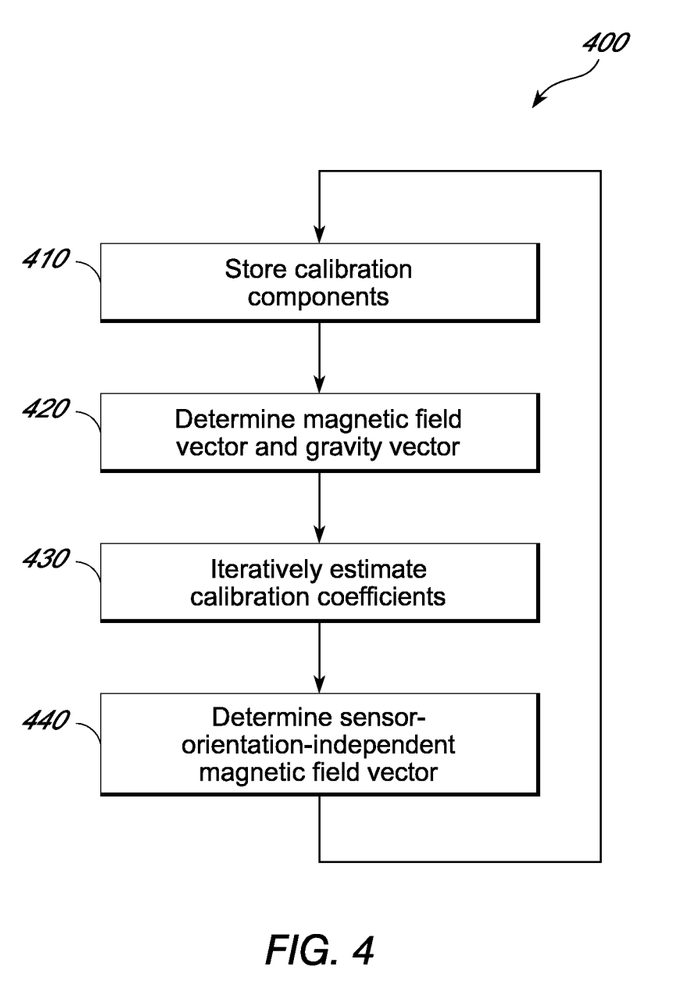
FIG. 4 is a flowchart illustrating a method of determining a magnetic field vector.

One or more of the aspects described above may be employed in a method of determining a magnetic field vector. FIG. 4 is a flowchart illustrating a method 400 of determining a magnetic field vector. The method 400 begins, in block 410, with the storage of one or more stored calibration components for each of a plurality of sensor orientations. The storage can be performed, for example, by the memory 120 of FIG. 1. In one embodiment, the stored calibration components comprise a stored calibration component dependent on at least one of soft iron perturbations or hard iron perturbations. For example, the stored calibration components may comprise at least one of U, P, Q, or V described above. The stored calibration components may also comprise a stored magnetic field vector and/or a stored gravity vector. The stored magnetic field vector in one embodiment is $\hat{F}_I$, a 3×1 vector of the magnetic field in instrument coordinates. In another embodiment, the stored magnetic field vector represents a direction, in two or three dimensions. In one embodiment, the stored magnetic field vector is a set of angles, whereas in another embodiment, the stored magnetic field vector is a set of magnetic field strengths. In one embodiment, the stored magnetic field vector indicates magnetic north. Similar, the stored gravity vector represents a direction, in two or three dimensions and can be a set of angles or a set of accelerations. In one embodiment, the stored gravity vector indicates the direction of gravity. In one embodiment, the stored gravity vector can be used to determine a 3×3 conversion matrix, M, for use in converting between instrument coordinates and geographic coordinates or between geographic coordinates and instrument coordinates.

The method 400 continued to block 420, where, for a sensor orientation not included in the plurality of sensor orientations, a magnetic field vector and a gravity vector are determined. The determined magnetic field vector can be determined, for example, by the magnetometer 160 of FIG. 1. The determined gravity vector can be determined, for example, by the accelerometer 170 of FIG. 1. As above, the determined magnetic field vector in one embodiment is $\hat{F}_I$, a 3×1 vector of the magnetic field in instrument coordinates. In another embodiment, the determined magnetic field vector represents a direction, in two or three dimensions. In one embodiment, the determined magnetic field vector is a set of angles, whereas in another embodiment, the determined magnetic field vector is a set of magnetic field strengths. In one embodiment, the determined magnetic field vector indicates magnetic north. Similar, the determined gravity vector represents a direction, in two or three dimensions and can be a set of angles or a set of accelerations. In one embodiment, the determined gravity vector indicates the direction of gravity. In one embodiment, the determined gravity vector can be used to determine a 3×3 conversion matrix, M, for use in converting between instrument coordinates and geographic coordinates or between geographic coordinates and instrument coordinates.

Next, in block 430, one or more calibration coefficients are iteratively estimated based on the stored calibration components and the determined vectors. The estimation can be performed, for example, by the processor 110 of FIG. 1. In one embodiment, the calibration coefficients comprise a calibration coefficient dependent on at least one of soft iron perturbations or hard iron perturbations. For example, the calibration coefficients may comprise at least one of U, P, Q, or V described above. In one embodiment, the calibration coefficients are estimated using an iterative algorithm in which the calibration coefficients are updated during each iteration. One embodiment of such an iterative algorithm is described above with respect to FIG. 2. Another embodiment of such an iterative algorithm is described with respect to the least squares solution whereas another embodiment is described with respect to the constrained and weighted least squares solution. Accordingly, in one embodiment, the calibration coefficients are updated so as to minimize a sum over the sensor orientations (the plurality and the additional sensor orientation) of squared errors between an estimated magnetic field in geographic coordinates and the actual magnetic field in geographic coordinates. In another embodiment, the calibration coefficients are updated based on the observability of one or more parameters. In one embodiment, estimating the calibration coefficients comprises estimating one or more a priori calibration coefficients based on the stored vectors and estimating the calibration coefficients based on the a priori coefficients and the determined vectors.

The method 400 continues to block 440 where a sensor-orientation-independent magnetic field vector is determined based on at least one of the calibration coefficients. In one embodiment, the sensor-orientation-independent magnetic field vector is an estimate of the magnetic field in geographic coordinates. In another embodiment, the sensor-orientation-independent magnetic field vector is an estimate of the magnetic field in another non-geographic set of coordinates which are independent of the sensor orientation. As an example, the sensor-orientation-independent magnetic field vector may be an estimate of the magnetic field in ship coordinates or in laboratory coordinates.

In one embodiment, the method 400 further comprises outputting the sensor-orientation-independent magnetic field vector to a display, a memory, or a transmitter. In one embodiment, the method 400 repeats. In certain embodiments, determining a magnetic field vector and a gravity vector is performed for more than one sensor orientation not included in the plurality of sensor orientations. All, or a subset, of these orientations may be used in estimating the calibration coefficients and determining a sensor-orientation-independent magnetic field vector.

Figure 5:
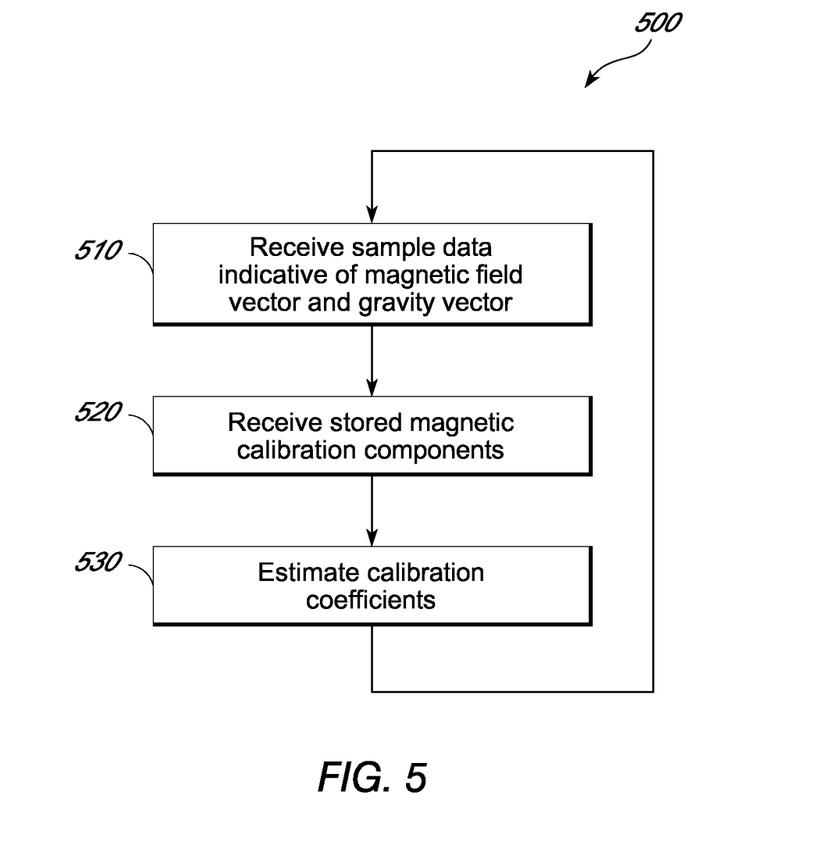
FIG. 5 is a flowchart illustrating a method of calibrating a magnetic compass.

The method 400 can be used to calibrate a magnetic compass. FIG. 5 is a flowchart illustrating a method of calibrating a magnetic compass. The method 500 begins, in block 510, with the reception of sample data indicative of a measured field vector and a gravity vector from at least one sensor oriented at a first plurality of orientations. In one embodiment, the sample data included a respective first plurality of measured field vectors and a respective first plurality of measured gravity vectors. The reception can be performed, for example, by the processor 110 of FIG. 1. The sample data may be, for example, received from the magnetometer 160 and accelerometer 170 or retrieved from the memory 120 of FIG. 1.

The method 500 continues to block 520 where a plurality of stored magnetic calibration components associated with a second plurality of orientations of the at least one sensor are received. The reception can be performed, for example, by the processor 110 from the memory 120 of FIG. 1. In one embodiment, the second plurality of orientations includes at least one orientation that is absent from the first plurality of orientations.

Next, in block 530, a plurality of calibration coefficients are estimated based on the sample data and the stored components. The estimation can be performed, for example, by the processor 110 of FIG. 1. In one embodiment, the estimation includes partitioning a first estimate of the calibration coefficients based on observability of the coefficients at the first plurality of orientations. The observability can be based, in one embodiment, on the sample data and the first plurality of orientations. Further, a weighting of the stored orientations is generated based on the first estimate. The weighting may be such that the weights have an inverse relationship to the observability of the first estimate of the calibration coefficients at the first plurality of orientations. In one embodiment, the plurality of calibration coefficients is determined based at least in part on the weighting.

In one embodiment, estimating the plurality of calibration coefficients includes an iterative least squares estimate based on minimizing the sum of the squared errors between the actual and estimated magnetic field in geographic coordinates over the sample data. In one embodiment, the least squares estimate is based on minimizing a distance between the estimated plurality of calibration coefficients and the plurality of stored components. In one embodiment, the estimation is based on received accelerometer data indicative of pitch and roll.

In one embodiment, the method 500 further comprises outputting the estimated coefficients to a display, a memory, or a transmitter. In one embodiment, the method 500 repeats. The estimated coefficients can be used to determine a sensor-orientation-independent magnetic field vector such as an estimate of the magnetic field in geographic coordinates.

Figure 6:
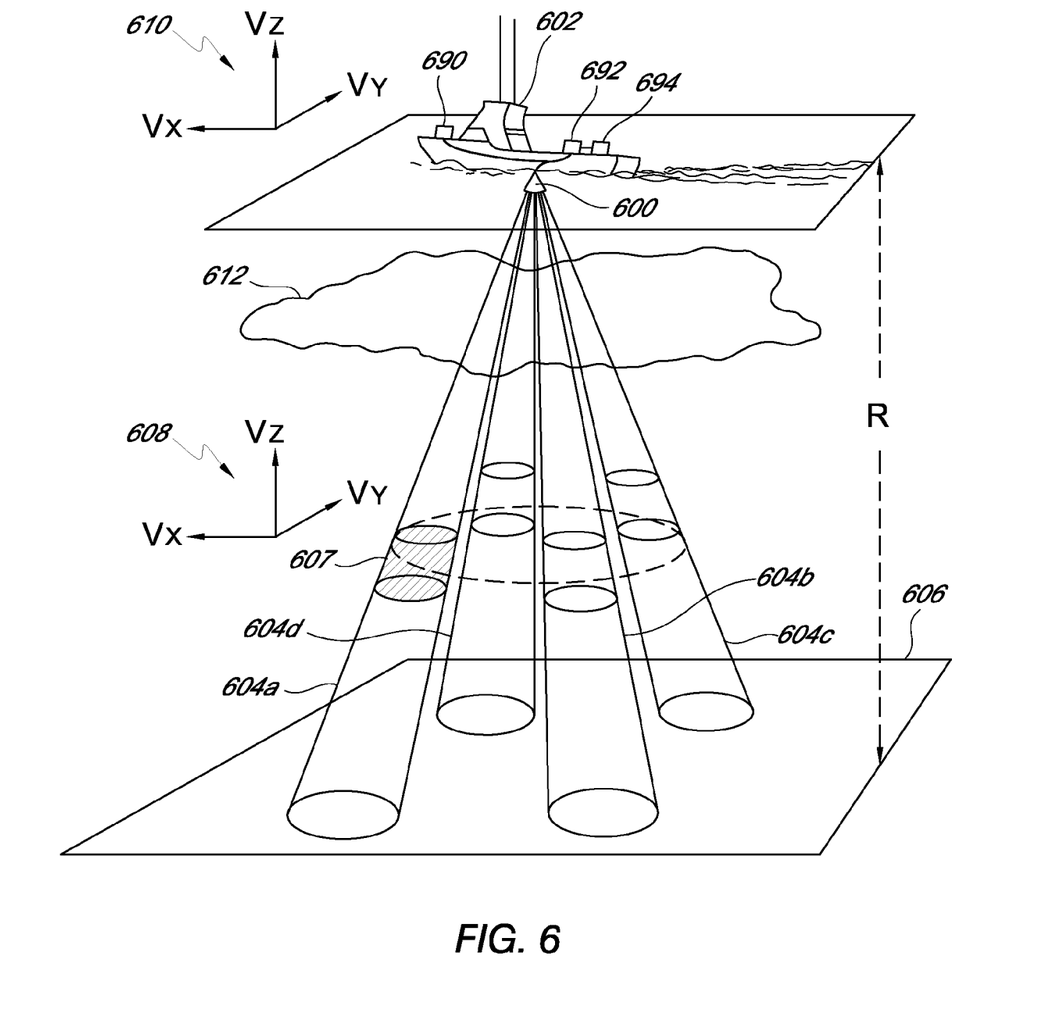
FIG. 6 is a perspective view of a download-looking current profiler having a Janus configuration of transducers, wherein the current profiler is attached to the hull of vessel.

A magnetic compass calibrated using the methods described above can be used in a variety of applications. In one embodiment, the magnetic compass is used in conjunction with a current profiler. FIG. 6 is a perspective view of a download-looking current profiler 600 having a Janus configuration of transducers, wherein the current profiler 600 is mounted on or near the hull of a vessel 600. The current profiler 600, as shown in FIG. 1, generates a set of acoustic beams 604a, 604b, 604c, 604d which emanate from one or more transducers. An exemplary current profiler is disclosed in U.S. Pat. No. 5,208,785, which is hereby incorporated by reference. In the illustrated embodiment, the current profiler 600 is downward-looking, that is, the acoustic beams 604 are directed in a generally vertical orientation towards an acoustically reflective surface such as the ocean bottom 606 or a life layer 612 and the beams 604 are in a Janus configuration. Each beam 604 "illuminates" a water column which can be decomposed into horizontal slices known as range, or depth, cells such as the cell indicated at 607. By suitable transmission of acoustic beams and reception of resulting echoes received from the cells, the echo data can be transformed into a Doppler frequency, a velocity along the beam 604, and then one or more orthogonal current velocity components such as those indicated at 608.

Because the vessel 602 is moving in the illustrated embodiment, the measured velocity of the range cell 607 is relative to the velocity of the vessel 602. Therefore, a bottom range pulse is periodically interleaved in the beams 604 to determine the orthogonal velocity components of the vessel 602 such as those indicated at 610. Further, orienting the velocity of the range cell 607 to a fixed reference frame, such as the earth, can be performed with knowledge of the orientation of the vessel 602. The orientation of the vessel 600 and the current profiler 600 attached to the vessel 602 can be determined using a magnetic compass 690. The magnetic compass can be integrated with the current profiler or could be separate and connected via data communications either wired or wireless. In one embodiment, the magnetic compass is calibrated using the methods and systems described above. A processor 692 receives measurements from the current profile 600 and the magnetic compass 690 and calculates orientation-independent measurements. These measurements can be stored in a memory 694.

Although bottom tracking using a downward looking current profiler 600 attached to a vessel 602 is described herein, it is to be recognized that other uses may be made of the methods and systems described herein. For example, embodiments may include, a current profiler 600 moored to the ocean bottom in an upward looking configuration. Such a configuration may be used to measure the movement of sheets of ice in one of the polar regions. In one embodiment, the current profiler 600 is used for river discharge measurements.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of determining a magnetic field vector, the method comprising:
    storing, for each of a plurality of sensor orientations, one or more calibration components;
    determining, for a sensor orientation not included in the plurality of sensor orientations, a magnetic field vector and a gravity vector;
    iteratively estimating, by a processor, one or more calibration coefficients based on the stored components, the determined magnetic field vector, and the determined gravity vector, wherein the calibration coefficients are updated during each of a plurality of iterations; and
    determining a sensor-orientation-independent magnetic field vector based on at least one of the calibration coefficients.

2. The method of claim 1, wherein the sensor-orientation-independent magnetic field vector is an estimate of the magnetic field in geographic coordinates.

3. The method of claim 1, wherein the one or more calibration coefficients comprises a coefficient dependent on at least one or soft iron perturbations or hard iron perturbations.

4. The method of claim 1, wherein at least one of the calibration coefficients is updated so as to reduce a sum over the sensor orientation of squared errors between an estimated magnetic field in geographic coordinates and the actual magnetic field in geographic coordinates.

5. The method of claim 1, wherein at least one of the calibration coefficients is updated based on the observability of one or more parameters.

6. The method of claim 1, wherein a magnetometer determines the magnetic field vector and the gravity vector for the sensor orientation not included in the plurality of sensor orientations.

7. A system for determining a magnetic field vector, the system comprising:
    a magnetic compass comprising:
        a memory configured to store, for each of a plurality of compass orientations, one or more calibration components;
        a magnetometer configured to determine a magnetic field vector for a compass orientation not included in the plurality of compass orientations;
        an accelerometer configured to determine a gravity vector for the compass orientation not included in the plurality of compass orientations; and
        a processor configured to i) iteratively estimate one or more calibration coefficients based on the stored components, the determined magnetic field vector, and the determined gravity vector, wherein the calibration coefficients are updated during each of a plurality of iterations, and ii) determine a compass-orientation-independent magnetic field vector based on at least one of the calibration coefficients,
    wherein the magnetic compass is mounted to a vessel configured to be navigable in bodies of water.

8. The system of claim 7, wherein the system further comprises an acoustic Doppler current profiler.

9. The system of claim 7, wherein the system further comprises a Doppler log.

10. The system of claim 7, wherein the system further comprises a surface-going boat.

11. The system of claim 7, wherein the system further comprises an underwater autonomous vehicle.

12. A method of calibrating a magnetic compass, the method comprising:
receiving sample data indicative of a measured magnetic field vector and gravity vector from at least one sensor oriented at a first plurality of orientations;
receiving a plurality of stored magnetic compass calibration components associated with a second plurality of orientations of the at least one sensor, wherein the second plurality of orientations includes at least one orientation that is absent from the first plurality of orientations; and
estimating, by a processor, a plurality of calibration coefficients based on the sample data and based on the plurality of stored magnetic compass calibration components,
wherein the estimating comprises:
partitioning a first estimate of the calibration coefficients based on observability of the calibration coefficients at the first plurality of orientations, wherein observability of the calibration coefficients is determined based on the sample data at the first plurality of orientations;
generating a weighting of the stored magnetic compass calibration components and the first estimate of the calibration coefficients based on the sample data; and
determining the estimated plurality of coefficients based at least in part on the weighting.

13. The method of claim 12, wherein estimating the plurality of calibration coefficients comprises performing an iterative least squares estimate based on minimizing a distance minimizes the sum of the squared error between the actual and estimated magnetic field in geographic coordinates over the sample data.

14. The method of claim 13, wherein the iterative least square estimate is further based on minimizing a distance between the estimated plurality of calibration coefficients and the plurality of stored magnetic compass calibration components.

15. The method of claim 12, further comprising:
receiving accelerometer data indicative of, pitch, and roll of the magnetic compass; and
estimating the plurality of calibration coefficients based on the received accelerometer data.

16. The method of claim 12, wherein generating the weighting comprises weighting the stored magnetic compass calibration components based on an inverse relationship to the observability of the first estimate of the calibration coefficients at the first plurality of orientations.

17. A system for determining a magnetic field vector, the system comprising:
a memory configured to store, for each of a plurality of sensor orientations, one or more calibration components;
a magnetometer configured to determine a magnetic field vector for a sensor orientation not included in the plurality of sensor orientations;
an accelerometer configured to determine a gravity vector for the sensor orientation not included in the plurality of sensor orientations; and
a processor configured to i) iteratively estimate one or more calibration coefficients based on the stored components, the determined magnetic field vector, and the determined gravity vector, wherein the calibration coefficients are updated during each of a plurality of iterations and ii) determine a sensor-orientation-independent magnetic field vector based on at least one of the calibration coefficients.

18. The system of claim 17, wherein the processor is configured to update at least one of the calibration coefficients so as to reduce a sum over the sensor orientation of squared errors between an estimated magnetic field in geographic coordinates and the actual magnetic field in geographic coordinates.

19. The system of claim 17, wherein the processor is configured to update at least one of the calibration coefficients based on the observability of one or more parameters.

20. A system for determining a magnetic field vector, the system comprising:
means for storing, for each of a plurality of sensor orientations, one or more calibration components;
means for determining, for a sensor orientation not included in the plurality of sensor orientations, a magnetic field vector and a gravity vector;
means for iteratively estimating one or more calibration coefficients based on the stored components, the determined magnetic field vector, and the determined gravity vector, wherein the calibration coefficients are updated during each of a plurality of iterations; and
means for determining a sensor-orientation-independent magnetic field vector based on at least one of the calibration coefficients.

21. A non-transitory computer-readable storage medium comprising instructions stored thereon relating to determination of a magnetic field vector, which when executed by a processor, cause the processor to:
process received data, for each of a plurality of sensor orientations, indicative of one or more calibration components;
determine, for a sensor orientation not included in the plurality of sensor orientations, a magnetic field vector and a gravity vector;
iteratively estimate one or more calibration coefficients based on the data indicative of one or more calibration components, the determined magnetic field vector, and the determined gravity vector, wherein the calibration coefficients are updated during each of a plurality of iterations; and
determine a sensor-orientation-independent magnetic field vector based on at least one of the calibration coefficients.

* * * * *